United States Patent [19]

Morganstein

[11] 3,945,845

[45] Mar. 23, 1976

[54] DISPLACEMENT-VARIABLE DAMPING FOR DASH-POT TYPE ELECTROLYTE AMPULE

[75] Inventor: Melvyn I. Morganstein, Silver Spring, Md.

[73] Assignee: The United States of America as represented by the Secretary of the Army, Washington, D.C.

[22] Filed: Nov. 15, 1974

[21] Appl. No.: 524,283

[52] U.S. Cl. ................................. 136/90
[51] Int. Cl.² ........................................ H01M 6/30
[58] Field of Search ....................... 136/90

[56] References Cited
UNITED STATES PATENTS 3,712,835   1/1973   Kaye ............................ 136/90
3,754,996   8/1973   Snyder .......................... 136/90

Primary Examiner—Malcolm F. Hubler
Assistant Examiner—Richard E. Berger
Attorney, Agent, or Firm—Nathan Edelberg; Robert P. Gibson; Saul Elbaum

[57] ABSTRACT

A dashpot type electrolyte ampule for a deferred action battery is described. The dashpot is designed to provide a damping force which varies as a function of piston position within the ampule. A maximum damping force is provided at the initial position of the piston and a minimum damping force is provided at the further most point of piston travel, just before rupture of the ampule. Various ampule designs are described to provide the variable damping force desired.

11 Claims, 12 Drawing Figures

DISPLACEMENT-VARIABLE DAMPING FOR DASH-POT TYPE ELECTROLYTE AMPULE

RIGHTS OF GOVERNMENT

The invention described herein may be manufactured, used, and licensed by or for the United States Government for governmental purposes without the payment to me of any royalty thereon.

BACKGROUND OF THE INVENTION

The present invention relates to an improved dashpot type of electrolyte ampule for deferred action batteries for rockets, missiles, or other projectile firing means. More specifically, the present invention relates to an improved dashpot for an ampule of the type described in U.S. Pat. No. 3,754,996 issued Aug. 28, 1973 to Gilbert R. Snyder and assigned to the same assignee as the present invention.

Ampules of the type described in the above mentioned U.S. Pat. No. 3,754,996 employ a cutter mechanism to puncture the bottom of the ampule under linear gun acceleration (setback) so as to permit the subsequent release of the electrolyte under radial (spin) acceleration. This cutter is driven downward under setback by an attached, cylindrical piston weight. This downward motion is opposed by forces from several sources, the support spring, the cutting resistance and hydraulic damping. The motion of the assembly may be described by the following expression:

$$\ddot{x} = (F_1 - F_2 - F_3 - F_4)/M. \quad (1)$$

(positive sense is downward)

where:
$\ddot{x}$ = Acceleration of piston-cutter
$F_1$ = Driving force due to setback
$F_2$ = Spring force
$F_3$ = Cutting force, the resistance of the diaphragm to puncture and tearing.
$F_4$ = Hydraulic damping force
$M$ = Mass of piston-cutter
Resolving each of the above forces:
or, resolving the F terms in (1)

$$\ddot{x} = [(G(t) [W] - (KX + A) - F_3(x) - K(\dot{x})^2] \quad (2)$$

where:
$G(t)$ = Acceleration g, setback, a function of time
$W$ = Weight of piston; not constant
$Kx$ = Spring force, a function of displacement, or = Spring constant, $K$, times displacement, $x$.
$A$ = Spring preload force
$F_3(x)$ = Cutting force, a function of displacement; $F_3$ = 0 between $x = 0$ and $x$ = diaphragm contact.
$K(x)$ = Hydraulic resistance, a function of velocity squared, however, when $x$ is positive, $F$ is positive and when $x$ is negative, $F$ is also negative. Also a function of clearance area.

$F_1$ is the driving force caused by the acceleration of the round. Thus it varies with the gun acceleration signature. One factor comprising this term is the weight of the piston-cutter. It should be noted that this factor is not necessarily constant since the piston may start into motion while still above the electrolyte. Upon striking the liquid, bouyancy reduces the effective weight of the copper piston by about 15%, thus altering the driving force proportionally.

One of the forces opposing the motion of the piston is caused by the spring which acts to keep the piston assembly up against the ampule lid and away from the bottom. The spring is made as light as possible so as to provide the minimum force necessary to keep the assembly suspended under static conditions. This force, $F_2$, which acts in the negative direction is a function of the spring constant and the displacement of the piston, thus varying linearly with the latter term. $F_2$ generally has an initial value due to spring preload.

Additional resistive force is encountered in the puncture and tearing of ampule bottom by the cutter blades. This force, $F_3$, also acts in the negative direction and is a function of such factors as cutter and bottom geometry, bottom strength; as well as varying in some manner with displacement.

Also opposing the motion of the assembly is the hydraulic resistance of the electrolyte to the piston as the latter travels downward under accelerative loading. For an ampule which is not filled completely with electrolyte, it should be apparent that no such resistive force exists until the piston actually strikes the liquid. This resistance, as noted previously, is a function of the cross-sectional area through which the electrolyte can flow past the piston. Since it also varies with the square of the piston velocity, the damping of piston movement increases markedly with increased rate of loading. The system thus acts as a dashpot to resist piston movement, and thus bottom diaphragm puncture and battery activation under the short abrupt loading that would occur if the fuze were inadvertently dropped. This constitutes a safety feature. Under sustained loading such as might occur during the setback, the fluid is given time to flow around the piston, which can now move downward. Thus the cutter can pierce the ampule bottom and the battery can activate.

The fluid resistance can be controlled markedly by varying the area through which the fluid can flow past the piston. For example, the resistance can be decreased by increasing the clearance between the piston and ampule (the cylinder) or by providing additional orifice area such as with peripheral slots and center holes. One problem with this method is that a simple increase in gap also increases the tendency for the piston to cock and jam. Further, any increase in orifice area, while improving the ease with which the ampule can be opened under setback, i.e., at lower $g$'s also decreases the effectiveness of the dashpot safety feature. Likewise, a decrease in area would provide for greater drop safety but also make the ampule more difficult to open at lower g setback.

In order to improve low g performance in the power supplies, such as that illustrated in U.S. Pat. No. 3,754,996 issued Aug. 28, 1973 three slots are incorporated in the periphery of the respective pistons. These slots double the flow area. Even with these slots, the fluid resistance accounts for almost 50% of the total force opposing piston motion while diaphragm puncture is occurring. The cutting force accounts for another approximately 50% and the spring the remaining few percent.

Just before cutting however, no damping is needed. If damping can be eliminated at this point the force available for cutting is doubled since the sum of the forces opposing motion is cut in half.

While the complete elimination of damping is impossible, a notable reduction in damping may be incurred by: widening or deepening the slots, increasing their number, providing additional fluid bypass orifices through the piston on the face, or increasing the piston-ampule clearance. For example, increasing the bypass area by 5 times would reduce damping by 80% or the overall total opposing forces by 40%, assuming $\dot{x}$ constant. Simply doing so, however, would also undesirably reduce drop safety.

SUMMARY OF THE INVENTION

Accordingly, it is an object of the present invention to provide a dashpot for a deferred action battery ampule which provides a high safety factor for handling to prevent activation due to accidental dropping.

It is a further object of the present invention to provide a dashpot for a deferred action battery ampule which is reliable for low g activation when fired from a gun or launch tube.

It is still a further object of the present invention to provide a dashpot for a deferred action battery ampule which is simple in construction and adaptable for mounting in deferred action batteries presently known in the art.

The objects of the present invention are fulfilled by providing a dashpot design whereby the orifice area, i.e., the area surrounding the piston in the dashpot cylinder, increases with increasing displacement of the piston, thus minimizing the effects of hydraulic damping just before the cutters engage the rupturable diaphragm but maximizing the effects of hydraulic damping when the piston first begins its downward path. Stated another way the normally constant factor $K$ in the $F_4$ term discussed hereinbefore for piston acceleration becomes a variable of, $K(X, \dot{X}^2)$, a function of velocity and displacement.

The dashpot design of the present invention provides for various preferred embodiments for modifying the orifice area in the direction of the displacement of the piston. In one embodiment the shape of the dashpot cylinder is modified while in another embodiment a specially shaped insert sleeve is inserted into the dashpot cylinder.

BRIEF DESCRIPTION OF DRAWINGS

The objects of the present invention and the attendant advantages thereof will become more readily apparent by reference to the description of the drawings wherein.

DETAILED DESCRIPTION OF DRAWINGS

Figure 1A:
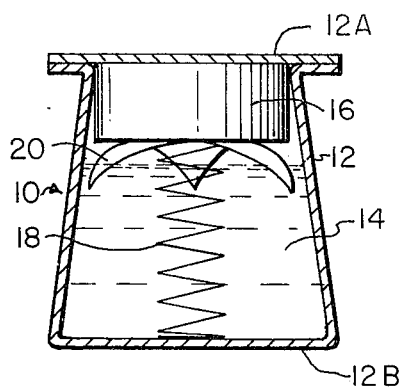
FIGS. 1A to 1C illustrate a first embodiment of the ampule design of the present invention and the stages of motion it experiences in response to setback forces.
Figure 1B:
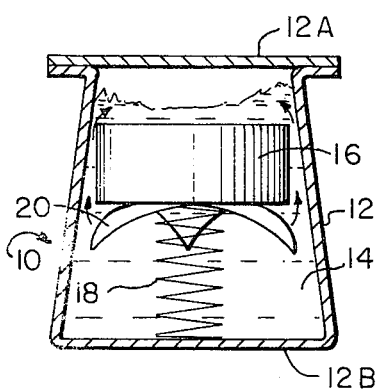
Figure 1C:
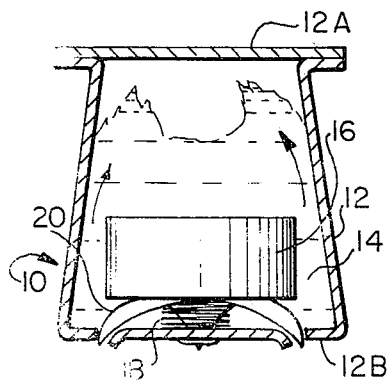

Referring in detail to FIGS. 1A to 1C there is illustrated a first embodiment of an ampule generally indicated 10 including a cylindrical container 12 having a lid 12A and a rupturable bottom 12B to be described more fully hereinafter. The ampule cylinder 12 is substantially filled with an electrolyte 14 which is to be subsequently released through rupturable bottom 12B. The electrolyte within cylinder 12 is at a level which substantially coincides with the bottom of a piston 16 as shown in FIG. 1A. Piston 16 under static conditions of the ampule is held in the position shown in FIG. 1A by a spring 18 and the buoyant force generated by electrolyte 14. Cutter blades 20 are provided on the bottom of piston 16 and are adapted to engage and rupture bottom 12B in response to setback forces to be described hereinafter. Three cutter blades are illustrated in FIGS. 1A to 1C. However, any number of blades may be used without departing from the spirit and scope of the present invention.

The entire ampule 10 is adapted for insertion into a deferred action battery of the type illustrated in U.S. Pat. No. 3,754,996 issued Aug. 28. 1973 to Gilbert R. Snyder and assigned to the same assignee as the present invention. As described in the Snyder Patent, the battery is mounted in a missile or projectile and the setback forces generated by the firing of the projectile cause displacement of the piston in the direction of the rupturable bottom of the ampule, whereby the cutter blades rupture said bottom and release the electrolyte into contact with the battery plates.

FIG. 1A shows the ampule in a static condition before firing of the projectile. As the projectile is fired setback forces in the direction of the ampule container bottom 12 cause piston 16 to downwardly move as shown in FIG. 1B against the force of spring 18 and the buoyant force of electrolyte 14. The piston continues to move downwardly until the cutter blades 20 rupture or cut through bottom 12B, as shown in FIG. 1C, thus releasing electrolyte 14 to the battery of the type described.

In the embodiment of FIGS. 1A to 1C the container walls of container 12 taper or slope outwardly from the top to the bottom of the container. The piston 16, container 12, and electrolyte 14 function as a dashpot with a variable size orifice. The size of the orifice between piston 16 and container 12 increases as the piston travels through the container. For reasons stated hereinbefore the hydraulic damping of electrolyte 14 is a maximum with the piston 16 in the position of FIG. 1A and is a minimum with the piston in a position 16 shown in FIG. 1C. The net effect is to provide maximum safety from accidental forces and maximum efficiency for low $g$ activation of the deferred action batter.

The side walls of container 12 in FIGS. 1A to 1C are shown as being gradually and continuously tapered from top to bottom. Tapering the can to a 0.030 greater diameter at the bottom than the top will increase the orifice clearance 200 to 600%, reducing damping by 67 to 85% at the end of the cutting stroke.

Figure 2:
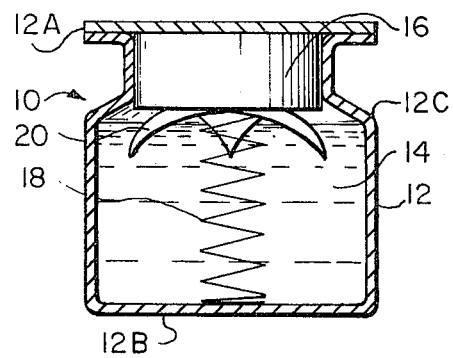
FIG. 2 illustrates a second embodiment of the ampule design of the present invention.

In another embodiment as illustrated in FIG. 2 the side walls of container 12 may be stepped as shown at 12C. Thus, the diameter of container 12 increases abruptly at 12C with a concomitant decrease in hydraulic damping. The distance of the step at 12C is so chosen that accidental forces such as dropping will not create an excursion of piston 16 beyond point 12C. Thus, the safety factor of the ampule is not decreased.

In either of the designs of FIGS. 1A to 1C and FIG. 2 some difficulty is encountered in that the diameters of the circle in which the cutter points lie must be reduced in order to allow the points to pass by the section of restricted diameter. This prevents the points from puncturing the bottom as close to the inner wall of the ampule as would be necessary to allow for complete emptying of the ampule under spin. The inclusion of some sort of vertical flute in the ampule wall to accommodate the cutter tips would solve this problem.

In another embodiment of the present invention the side walls of container 12, instead of being tapered or stepped in their entirety, are provided with internal flutes or steps 22 to accomplish a similar result. An example of the operation of these internal flutes or steps 22 is illustrated in FIGS. 3A to 3B.

Figure 3A:
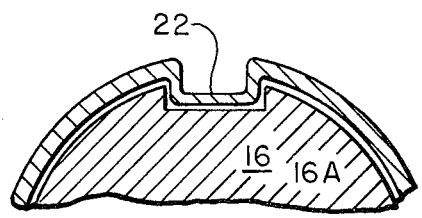
FIGS. 3A to 3C illustrate the operation of a third embodiment of the ampule design of the present invention.
Figure 3B:
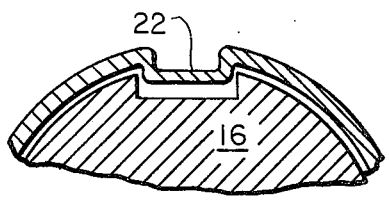
Figure 3C:
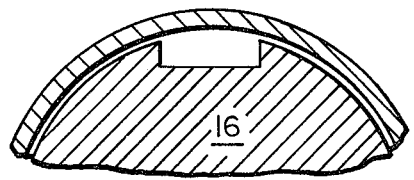

As shown in FIGS. 3A to 3B the depth of the flute 22, that is, the distance it extends toward the center of container 12, decreases from top to bottom. As shown in FIG. 3A the flute 22 is of a maximum depth at the top of the container thus providing minimum clearance with the slots 16A in piston 16. As piston 16 moves approximately half way down container 12, it can be seen that flute 22 tapers to a lesser depth providing an increased clearance with relief slots 16A. FIG. 3C illustrates the piston 16 in the cutting position in the bottom of container 12. Since there are no flutes around the bottom of container 12, this position illustrates a maximum clearance within relief slots 16A.

Figure 4B:
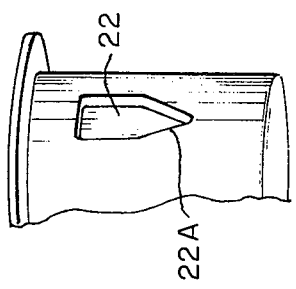
FIG. 4B illustrates another form of the third embodiment of the ampule design of FIG. 3.
Figure 4A:
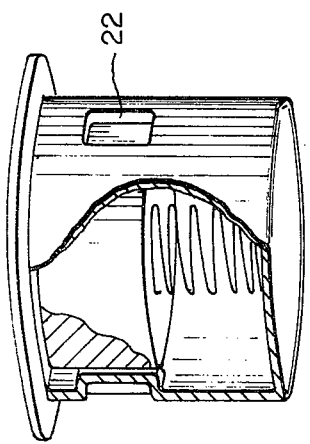
FIG. 4A illustrate one form of the third embodiment of the ampule design of FIG. 3.

In an alternative embodiment to FIG. 3 the flutes can be stepped as shown in FIG. 4A. The effective bypass area in either case is a maximum at the terminus of piston travel. In either case, the tangential $g$ loading due to angular acceleration is negligible when compared to the axial or setback $g$ load. Thus, binding of the ampule would not be a problem.

As a modification of the flute of FIG. 4A a tapered section 22A is added to the stepped flute. Under certain drop conditions (accidental) piston displacement can be excessive and the piston could move below the step of FIG. 4A. Piston cocking could then occur and the device could not be reset. The tapered extension 22A of the flute having reduced damping effectiveness could preclude this.

Figure 5A:
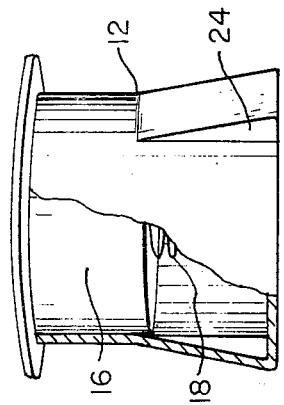
FIG. 5A illustrates one form of a fourth embodiment of the ampule design of the present invention.
Figure 5B:
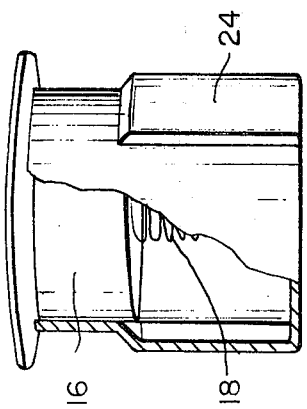
FIG. 5B illustrates another form of the fourth embodiment of the ampule design of the present invention.

Still another embodiment of the present invention is illustrated in FIGS. 5A and 5B which disclose the use of external flutes 24 on cylindrical container 12. Looking at it another way, FIGS. 5A and 5B disclose the use of concave internal flutes around the bottom of container 12. The advantage of the design of FIGS. 5A and 5B is that the need for relief slots in piston 16 is eliminated. As long as the greatest diameter of the container 12 through the flutes is no greater than the inner diameter of the surrounding battery electrodes it is not necessary to provide slots for the flutes in the electrodes themselves. The external flutes 24 may be either tapered, as shown FIG. 5A or stepped as shown in FIG. 5B.

Figure 6:
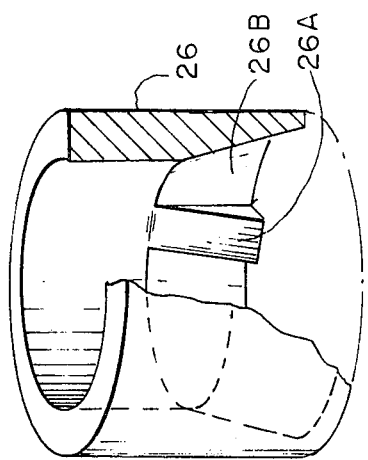
FIG. 6 illustrates a fifth embodiment of the ampule design of the present invention.

A further embodiment of the present invention is illustrated in FIG. 6. In this embodiment a sleeve 26 of a varying internal diameter is inserted into ampule container 12. This precludes the need for modifying existing ampule containers 12. A plurality of locating ribs or guides 26A may be provided in the tapered section 26B to keep piston 16 centrally aligned in ampule container 12.

Sleeves 28 may be manufactured in any of several ways from any of several materials. They may be molded from an acid resistant FRP (fiberglass-reinforced plastic.) Acceptable plastics for this use are polystyrene, polypropylene or Noryl (modified polyphenylene oxide, or PPO). All of these materials mold with reasonably good accuracy and are not affected by fluoroboric acids. (Plastics which have good molding characteristics but which are unacceptable in terms of their acid resistance include Delrin and Nylon.) The sleeve may be molded also of ceramic materials or a suitably inert metal such as copper. Powder metal technology may be utilized for materials such as copper. In addition, the sleeve could be stamped, drawn or machined. In any case, one may note that the sleeve may be inserted into the ampule after the piston-cutter is in place. This means that cutters of the full ampule internal diameter may be used allowing for complete emptying of the ampule under spin. An O-ring type seal of a suitably inert material such as Teflon may be incorporated around the sleeve 26 to prevent electrolyte flow-by outside the sleeve under setback.

It should be borne in mind that for any of the previously discussed designs that bypass area need not vary incrementally (stepped design) nor linearly (straight taper design) with piston displacement. That is, the function $K(x)$ need not be first order but may vary in any manner necessary to produce proper operation under the specific conditions which will be encountered, i.e., $K(X^n)$.

I wish it to be understood that I do not desire to be limited to the exact details of construction shown and described, for obvious modifications can be made by a person skilled in the art.

I claim:

1. In an ampule for a deferred action battery including a container with a fluid electrolyte therein, said container having a piston mounted therein and resilient means for normally holding said piston at a first end of said container, means on one end of said piston for puncturing a second end of said container which is opposite said first end, whereby said container, resilient means, electrolyte, and piston form dashpot means for generating a damping force in opposition to the movement of said piston, the improvement in said dashpot means comprising:

an annular orifice defined by said piston and the walls of said container which increases from a minimum size at said first end of said container to a maximum size at said second end of said container.

2. The ampule of claim 1 wherein the inside walls of said container taper outwardly from said first end of said container toward said second end thereof.

3. The ampule of claim 2 wherein the inside walls of said container are stepped outwardly from a predetermined distance from said first end toward said second end.

4. The ampule of claim 1 wherein said container is provided with convex flutes on the inside walls thereof, said flutes extending a predetermined distance from said first end of said container.

5. The ampule of claim 4 wherein said flutes are tapered from said first end of said container toward said second end thereof.

6. The ampule of claim 4 wherein said convex flutes are steps extending a predetermined distance from said first end of said container.

7. The ampule of claim 6 wherein said steps have tapered end portions on the bottom thereof.

8. The ampule of claim 1 wherein said container is provided with concave flutes on the inside of said container, said flutes extending a predetermined distance from the second end of said container.

9. The ampule of claim 8 wherein said concave flutes are steps extending a predetermined distance from said second end of said container.

10. The ampule of claim 8 wherein said concave flutes taper inwardly from said second end of said container toward said first end thereof.

11. The ampule of claim 1 wherein said container is substantially cylindrical and a removable sleeve is provided within said cylinder, the internal side walls of said removable sleeve tapering outwardly from said first end of said container toward said second end thereof.

* * * * *